May 30, 1961  J. T. WORCESTER  2,985,974
FISH BAIT CATCHER
Filed Nov. 13, 1959  2 Sheets-Sheet 2
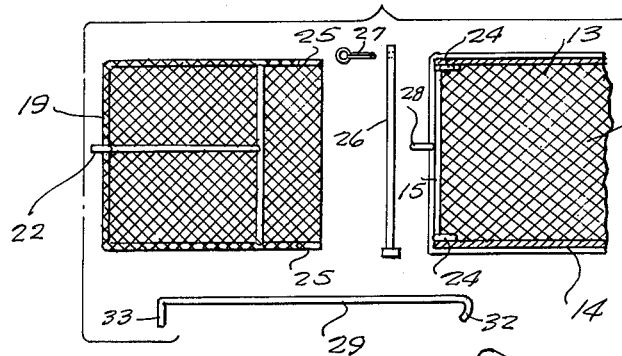
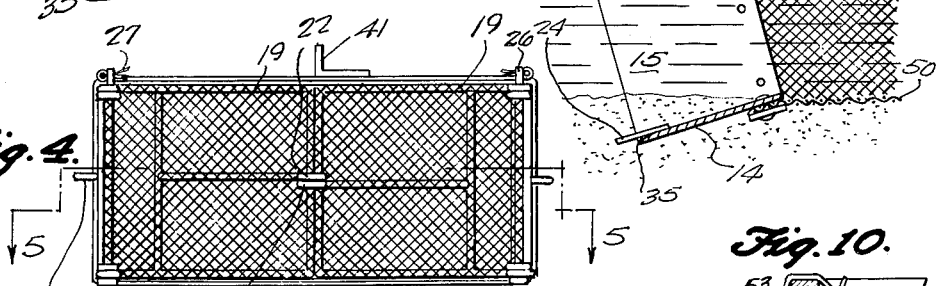
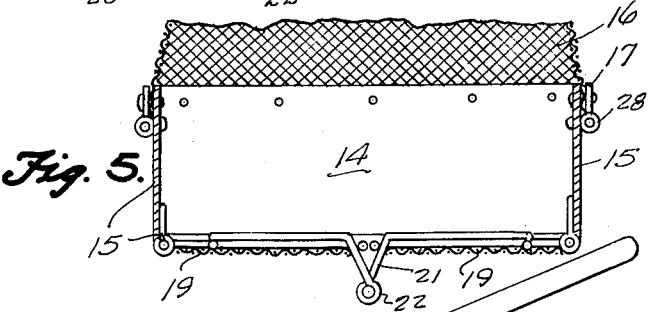
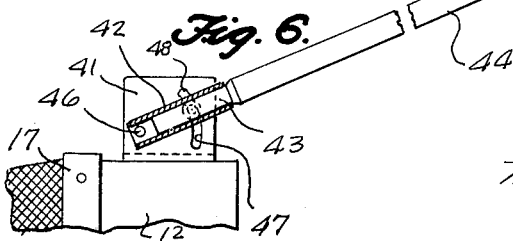
INVENTOR.
Joseph T. Worcester,
BY
McMorrow, Berman + Davidson
ATTORNEYS

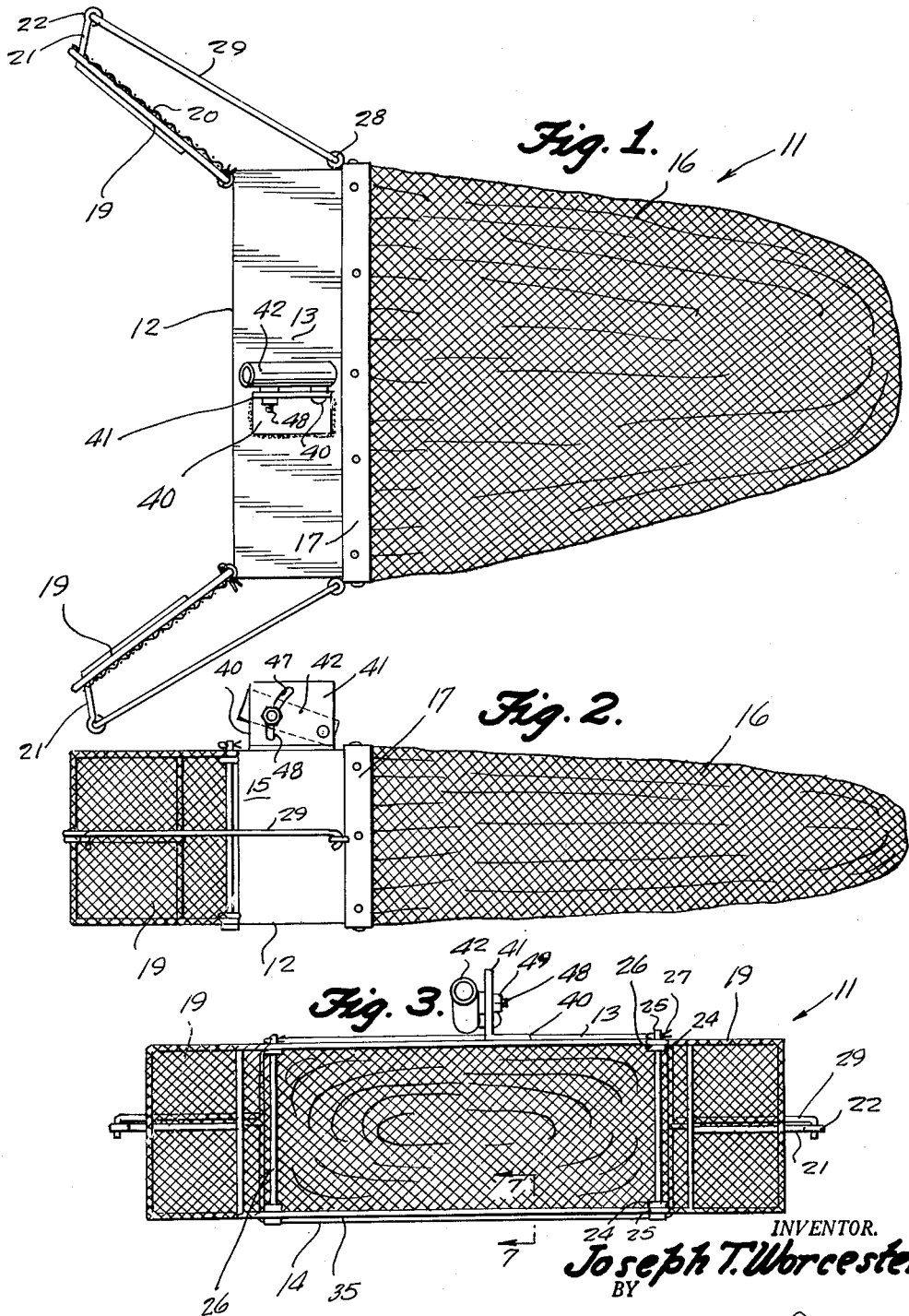

United States Patent Office 2,985,974
Patented May 30, 1961

2,985,974

FISH BAIT CATCHER

Joseph T. Worcester, Box 351, Fairhope, Ala.

Filed Nov. 13, 1959, Ser. No. 852,669

2 Claims. (Cl. 37—55)

This invention relates to bait traps, and more particularly to a fish bait trap of the type adapted to be moved along the bottom in shallow water to dislodge and capture bait, such as minnows, sand fleas, and the like.

The main object of the invention is to provide a novel and improved fish bait catcher which is simple in construction, which is easy to operate, and which enables bait fish and similar creatures to be quickly and efficiently captured.

A further object of the invention is to provide an improved bait trap for collecting minnows, sand fleas, and similar bait, the trap being inexpensive to fabricate, being durable in construction, being easy to manipulate, and being further adapted to be employed as a housing for a tackle box or similar equipment when it is not being used to catch bait.

Further objects and advantages of the invention will become apparent from the following description and claims, and from the accompanying drawings, wherein:

Figure 1 is a top view of an improved bait trap constructed in accordance with the present invention, shown in its open operative position.

Figure 2 is a side elevational view of the bait trap of Figure 1.

Figure 3 is an end elevational view of the bait trap of Figures 1 and 2, taken from the forward or open side of the trap.

Figure 4 is an end elevational view, similar to Figure 3, but showing the closure members of the trap in closed positions.

Figure 5 is a fragmentary horizontal cross sectional view taken substantially on the line 5—5 of Figure 4.

Figure 6 is a fragmentary longitudinal vertical cross sectional view taken through the ferrule element of the bait trap of Figures 1 to 5 and showing the manner in which a handle is engaged in the ferrule.

Figure 7 is an enlarged fragmentary vertical cross sectional view taken substantially on the line 7—7 of Figure 3.

Figure 8 is a fragmentary longitudinal vertical cross sectional view taken through the forward end portion of the main body of the bait trap of Figures 1 to 7 and an elevational view of one of the closure members associated with the main body of the bait trap, together with the parts employed to fasten the closure member to the main body and to support the closure member in an outwardly extending position with respect to the main body, the elements being shown in separated positions.

Figure 9 is a fragmentary vertical longitudinal cross sectional view taken through the forward end portion of the bait trap of Figures 1 to 8 and showing the manner in which the box-like frame member is held in an inclined, downwardly and forwardly directed position so that the blade element thereof may dislodge bait material when the device is pulled forwardly.

Figure 10 is a side elevational view showing the manner in which the bait trap may at times be employed as a receptacle for fish or bait.

Figure 11 is a vertical cross sectional view taken longitudinally through the bait trap and illustrating the manner in which it may be at times employed as a receptacle for a tackle box or similar equipment.

Referring to the drawings, 11 generally designates an improved bait trap, the trap comprising a horizontally elongated, box-like rigid frame member 12 which is provided with the imperforate top, bottom and side walls 13, 14 and 15, 15. The box-like frame member is of substantial longitudinal length and is open at its forward end. Secured peripherally to the rear end of the generally rectangular box-like receptacle 12 is a flexible net 16 of mesh material, such as cord mesh, of substantial size, as shown in Figure 1. The net 16 may be secured to the periphery of the box-like frame member 12 in any suitable manner, as by being clamped to the peripheral margin of the frame by peripheral clamping straps 17.

A pair of rectangular rigid gate members 19, 19 are hinged vertically to the opposite forward side edges of the frame member 12, namely, to the forward vertical edges of the side walls 15, 15, the gate members 19 comprising suitable rigid frames to which is secured foraminous mesh material 20.

The gate members 19, 19 are substantially identical in size and are dimensioned to define a front closure for the frame member 12 when swung to positions engaging the front edges of the walls of the frame member, for example, as shown in Figures 4 and 5.

Rigidly secured to the free vertical marginal portions of the gate members 19, 19 are respective outwardly projecting apertured lugs 21, 21, said lugs being shaped so that when the gate members are swung to their closed positions, as shown in Figures 4 and 5, the eye portions 22, 22 of the lugs will register vertically and will be superimposed, whereby a suitable vertical fastening bolt may be engaged through the superimposed eye members 22, 22 to secure the gate members in their closed positions.

The respective gate members 19, 19 are vertically hinged to the forward vertical edges of the side walls 15, 15 by the provision of suitable hinge lugs 24, 24 at the top and bottom ends of said vertical edges and by the provision of corresponding hinge lugs 25, 25 at the top and bottom rear corners of the gate members, as shown in Figure 8. The lugs 24, 24 and 25, 25 are vertically registrable, and a vertical hinge bolt 26 is engaged through the registering lugs, the hinge bolt being held in place by a cotter pin 27 engaged through the top end of each bolt 26. It will be understood that the hinge structure shown in Figure 8 is duplicated at the opposite sides of the frame 12, both of the gate members 19, 19 being hinged to the frame in the same manner.

An apertured lug 28 is provided at the rear portion of each side wall 15 of frame 12, the lug 28 projecting outwardly, as shown in Figure 8. A rigid brace bar 29 is employed to connect each apertured lug 28 to the eye portion 22 of the outwardly projecting gate lug 21 adjacent thereto, as shown in Figure 1, whereby to rigidly support the associated gate member 19 in an outwardly and forwardly inclined position, wherein the gate members are in forwardly diverging relationship. Each brace bar 29 is provided at one end with a hook portion 32 which is engageable with the corresponding apertured lug 28 and with a right angled portion 33 at its opposite end which is engageable in the corresponding eye element 22 on the adjacent lug 21.

As will be readily apparent, the brace bars 29 may be easily removed to allow the gate members 19 to be swung to their closed positions.

The bottom wall 14 of frame member 12 is formed with a sharpened front edge 35 extending substantially for its full length and defining a scraping blade which is engageable with the bottom of a shallow body of water to dislodge bait material therefrom as the device is pulled forwardly along said bottom, as will be presently described.

An angle bracket 40 is rigidly secured to the intermediate portion of the top wall 13 of frame 12, the angle bracket being provided with the vertical upstanding flange 41 to which is pivotally connected a tubular socket member 42 adapted to receive the reduced forward portion 43 of an elongated handle rod 44. The socket member 43 is pivoted to the vertical flange 41 by a suitable pivot bolt or rivet 46 so that it is swingable in a vertical plane parallel to the flange 41. Said flange is formed with an arcuate slot 47 through which extends a clamping bolt 48, said bolt being employed to secure the reduced portion 43 of handle 44 in the socket and also as a means to clamp the socket in an angularly adjusted position on the flange 41. The bolt 48 projects through the arcuate slot 47 and is provided with a clamping nut 49 which lockingly engages flange 41 when tightened so as to rigidly secure the tubular socket 42 in its adjusted position.

The bait trap is set up for use by securing the closure members 19, 19 in their outwardly and forwardly extending positions, illustrated in Figures 1 to 3, employing the brace bars 29 in the manner above described to support the closure members 19, 19 in forwardly diverging relationship. The handle bar 44 is secured in the socket 42 by the fastening bolt 48 and the socket is clamped in a suitably adjusted position in accordance with the convenience of the person using the device. The device is then pulled along the bottom 50 of the shallow body of water in the manner illustrated in Figure 9 whereby the scraping blade 35 engages the bottom and acts to dislodge bait material therefrom in response to the forward movement of the trap device. The bait material thus dislodged moves into the net 16 and is trapped therein. When a sufficient quantity of bait has been collected, the gate members 19, 19 may be unfastened and swung to their closed positions, such as those illustrated in Figures 4 and 5 and may be locked by engaging a suitable fastening pin through the superimposed eye members 22, 22, as above described.

As shown in Figure 10, the device may be at times employed as a receptacle for fish or bait, to suspend the fish or bait in the water adjacent to the side of a boat 52, as illustrated, the device being secured to the boat by means of suitable cables 53 connected to the apertured lug members 28, as illustrated.

As is further shown in Figure 11, when the device is not in use, it may be employed as a storage housing for a tackle box 54, or other fisherman's equipment, the net 16 being stowed within the rigid box-like frame 12, along with the tackle box 54 and the other associated equipment. The gate members 19 are secured in closed positions, so that the device occupies a minimum amount of space and may be easily stored or transported.

While a specific embodiment of an improved bait trap has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A bait trap of the character described comprising a horizontally elongated box-like rigid frame member having imperforate top, bottom and side walls and being open at its forward end, a flexible net of mesh material peripherally secured to the rear end of said frame member, a pair of rigid gate members hinged vertically to the opposite forward side edges of said frame member and defining a front closure for the frame member when swung inwardly into engagement with the forward end of the frame member, respective outwardly projecting apertured lugs secured on the free vertical margins of said gate members, said lugs being directed so that their apertures will register vertically with each other to receive a fastening member when the gate members are in their closed positions in engagement with the forward end of the frame member, respective additional apertured lugs secured on the sides of said frame member, respective brace bar members detachably engageable with the apertured lugs on the gate members and the apertured lugs on the sides of the frame member and being of sufficient length to secure said gate members in forwardly diverging relation with respect to each other, and a transverse forwardly projecting scraping edge on the bottom wall of said frame member.

2. A bait trap of the character described comprising a horizontally elongated box-like rigid frame member having imperforate top, bottom and side walls and being open at its forward end, a flexible net of mesh material peripherally secured to the rear end of said frame member, a pair of rigid gate members hinged vertically to the opposite forward side edges of said frame member and defining a front closure for the frame member when swung inwardly into engagement with the forward end of the frame member, respective outwardly projecting apertured lugs secured to the free vertical margins of said gate members, said lugs being directed so that their apertures will register vertically with each other to receive a fastening member when the gate members are in their closed positions in engagement with the forward end of the frame member, respective additional apertured lugs secured on the sides of said frame member, and respective brace bar members detachably engageable with the apertured lugs on the gate members and the apertured lugs on the sides of the frame member and being of sufficient length to secure said gate members in forwardly diverging relation with respect to each other.

References Cited in the file of this patent

UNITED STATES PATENTS

| | | |
|---|---|---|
| 284,156 | Woodruff | Aug. 28, 1883 |
| 589,047 | Thomas | Aug. 31, 1897 |
| 1,088,099 | Saunders | Feb. 24, 1914 |
| 1,141,423 | Simas | June 1, 1915 |
| 1,703,402 | Matsuoka | Feb. 26, 1929 |
| 2,413,552 | Ethridge | Dec. 31, 1946 |